United States Patent Office 2,769,012
Patented Oct. 30, 1956

2,769,012
QUINONE SUBSTITUTED PHTHALIC ACIDS

Albert Schmelzer, Koln-Mulheim, and Otto Bayer, Leverkusen-Bayerwerk, Germany, assignors to Farbenfabriken Bayer Aktiengesellschaft, Leverkusen, Germany, a corporation of Germany No Drawing. Application July 15, 1952,
Serial No. 298,998

Claims priority, application Germany August 1, 1951

5 Claims. (Cl. 260—326)

This invention relates to substituted phthalic acids and is more particularly concerned with certain derivatives of phthalic acid and a process for the production thereof.

It is well known that derivatives of phthalic acid are difficult to be obtained on a practical scale.

It is therefore an object of this invention to provide a commercially feasible method for producing substituted phthalic acids. Another object is to provide certain novel derivatives of phthalic acid. Still other objects will appear hereinafter.

The above and other objects may be accomplished in accordance with the invention by reacting a diazo compound of 4-amino phthalic acid or its derivatives with a member of the group consisting of quinones, acrylonitrile and similar vinyl compounds susceptible to polymerization. In general the reaction is carried out in a neutral or weakly acid medium. In certain instances, it may be of advantage to add a copper compound such as cupric chloride as a catalyst.

Taking a diazo salt of 4-amino phthalimide and benzoquinone as starting materials the reaction which occurs in accordance with the invention may be written as follows:

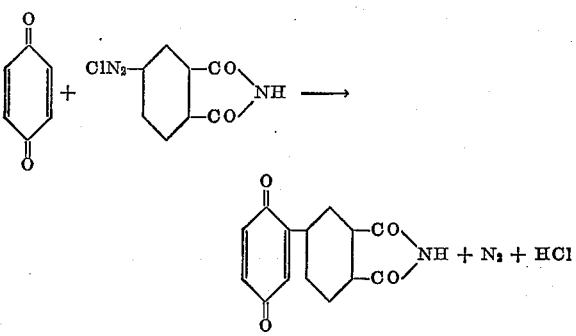

The derivatives of 4-amino phthalic acid which may be used in our process include 4-amino phthalimide and the amides, esters and nitriles of 4-amino phthalic acid.

Among the quinones which will react to give useful products are benzoquinone, chlorobenzoquinone, 2.3-dimethyl benzoquinone, tert.-butyl benzoquinone, phenyl benzoquinone, α- and β-naphthoquinone, 1.2-naphthoquinone-4-sulfonic acid, 1.4-naphthoquinone-6-carboxylic acid and -6-sulfonic acid, 1.4-dibenzene sulfoquinone diimide, 5.8-quinoline quinone, the indophenols

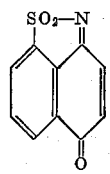

etc. Vinyl compounds, other than acrylonitrile, susceptible to polymerization include acrylic ester, acrolein acetal, vinyl methyl ketone etc.

The substituted phthalic acids obtainable by our invention are capable of a wide variety of reactions. Thus derivatives of phthalic acid containing a quinoid ring can be reduced and then alkylated or acylated. By catalytical hydrogenation and subsequent dehydration the quinoid ring can be converted to a benzene nucleus. Chlorination of the quinoid ring yields products which may undergo the reactions of chloranil. The products obtained from vinyl compounds as hereinabove described can also be submitted to a great many reactions by known methods.

The invention makes it possible to produce a great number of substituted phthalic acids in a simple and easily controllable manner. These substituted phthalic acids have been found to be useful intermediates in the preparation of phthalocyanines. Depending upon the constitution of the former, green and blue dyestuffs of different solubility can be produced.

The following examples in which the parts are by weight further illustrate the invention.

Example 1

Preparation of 4-phthalimido benzoquinone:

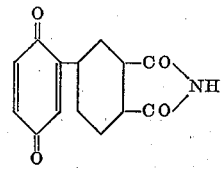

102 parts of 4-amino phthalimide suspended in 1250 parts of water and 680 parts of 37% hydrochloric acid are diazotized with a solution of 50 parts of sodium nitrite in 150 parts of water at 8–15° C. A clear diazo solution is obtained. 76 parts of quinone are suspended in a solution of 625 parts of anhydrous sodium acetate in 2,500 parts of water containing acetic acid as a buffer substance. The diazo solution is added dropwise to the above suspension at 20–23° C. while vigorously stirring. 4-phthalimido benzoquinone precipitates in the form of a yellow powder with the evolution of nitrogen. After stirring for one hour the precipitate is sucked off and thoroughly washed with water. The yield amounts to 139 parts (84% of theory) of crude material melting at 217–218° C. After recrystallization from glacial acetic acid the product melts at 220–221° C.

Example 2

Preparation of 4-phthalimido-α-naphthoquinone:

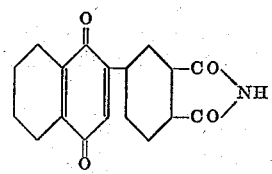

20.3 parts of 4-amino phthalimide suspended in 250 parts of water and 135 parts of 37% hydrochloric acid are diazotized at 8–15° C. with a solution of 10 parts of sodium nitrite in 30 parts of water. The diazo solution is neutralized by addition of 125 parts of anhydrous sodium acetate in 250 parts of water. 30 parts of α-naphthoquinone are dissolved in 800 parts of alcohol with heating and, if necessary, the solution is filtered. The diazo solution is added dropwise to the above solution at 22–24° C. while stirring. Nitrogen is evolved. After stirring for about 16 hours no more diazo compound is present. The yield amounts to 31.5 parts (83% of theory) of an orange-brown colored product melting at 320° C. after recrystallization from glacial acetic acid.

By catalytical hydrogenation and subsequent dehydration the following compound may be obtained:

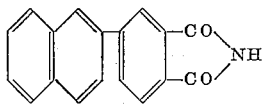

Example 3

Preparation of 4-phthalimido-β-naphthoquinone. 20.3 parts of 4-amino phthalimide are diazotized as described in Example 2 and neutralized by addition of a sodium acetate solution. 30 parts of β-naphthoquinone are dissolved with heating in 790 parts of glacial acetic acid and 500 parts of water. Then the solution is cooled to 20° C. At this temperature the diazo solution is rapidly added. Nitrogen is evolved and a brown product precipitates. After stirring for one hour no more diazo compound is present. The precipitate is sucked off, thoroughly washed with water and dried. The yield amounts to 29 parts (76% of theory) of a product melting at 313–315° C.

Example 4

Preparation of 4-phthalimido-β-naphthoquinone starting from the potassium salt of β-naphthoquinone-4-sulfonic acid.

20.3 parts of 4-amino phthalimide are diazotized as described in Example 2. 63 parts of the potassium salt of 1.2-naphthoquinone-4-sulfonic acid (purity: 83.6%) are dissolved in 5000 parts of water containing 125 parts of anhydrous sodium acetate. The diazo solution is added dropwise to the above solution at 28–30° C. A brown product precipitates with the evolution of nitrogen. After stirring for 12 hours no more diazo compound is present. The solution is worked up as described in Example 3.

Example 5

Reaction of 4-amino phthalimide with acrylonitrile. 32.4 parts of 4-amino phthalimide are suspended in 200 parts of water and 95 parts of 37% hydrochloric acid are added while stirring. The diazotization is effected at 0–5° C. with a solution of 14 parts of sodium nitrite in 30 parts of water. After removal of the surplus nitrous acid by amino sulfonic acid sodium acetate is added to the filtered diazo solution until congo paper is no longer blued. Then a solution of 15 parts of acrylonitrile in 158 parts of acetone is added to the above solution. Thereupon 10–15 parts of cupric chloride are added to the mixture at 15–20° C. Nitrogen is evolved and a yellow oil precipitates. The temperature slowly rises to 35° C. When the evolution of nitrogen has ceased the reaction mixture is cooled to 10–15° C. the oil solidifying thereby. The precipitate is filtered off and recrystallized several times from methanol. A product melting at 147° C. and having the constitution:

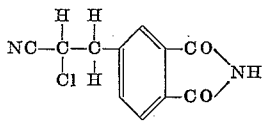

is obtained. By splitting off HCl with a tert. amine and subsequent saponification

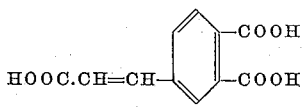

is obtained.

Similarly acrylic acid and vinyl methyl ketone may be reacted with 4-amino phthalimide.

Example 6

Preparation of 4 - benzoquinonyl - N - β - hydroxyethyl phthalimide. A solution of 65 parts of 4-amino-N-β-hydroxyethyl phthalimide in 300 parts of water and 120 parts of 37% hydrochloric acid is diazotized at 5–10° C. with a solution of 22 parts of sodium nitrite in 50 parts of water. 38 parts of finely powdered benzoquinone are suspended in a solution of 120 parts of anhydrous sodium acetate in 1000 parts of water. The diazo solution is rapidly run into this suspension at 19–24° C. while vigorously stirring. Nitrogen is immediately evolved and 4-benzoquinonyl-N-β-hydroxyethyl phthalimide precipitates. After stirring for 2 hours the yellow-brown precipitate is sucked off and thoroughly washed with water. After recrystallization from alcohol the compound melts at 157–159° C.

We claim:

1. A novel chemical compound in which a quinone radical is linked in the o-position to the 4-position of a phthalyl radical, said quinone radical being selected from the group consisting of benzoquinonyl and naphthoquinonyl, the phthalyl radical being selected from the group consisting of the radicals of phthalic acid, a lower alkyl phthalate, phthalimide and N-lower hydroxy alkyl phthalamides.

2. 4-phthalimido benzoquinone having the following structure:

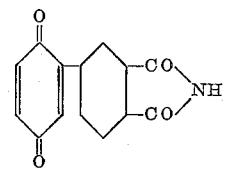

3. 4-phthalimido-β-naphthoquinone having the following structure:

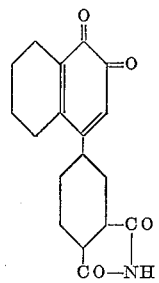

4. 4-quinonyl-N-β-hydroxyethyl phthalimide of the formula:

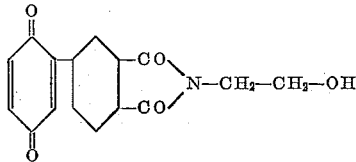

5. A process for the synthesis of novel chemical compounds which process comprises reacting phthalimide with an unsubstituted quinone selected from the group consisting of benzoquinone and naphthoquinone.

References Cited in the file of this patent

Chem. Abst., vol. 23, p. 2430, citing Covello, Univ. Naples, Rend. Accad. sci. Napoli 34 (3), 149–51 (1928).

Chem. Abst., vol. 37, p. 109, citing Bettolo, Gazz Chem. ital. 71, 627–35 (1941).